US007865779B2

(12) United States Patent
Tsang

(10) Patent No.: US 7,865,779 B2
(45) Date of Patent: Jan. 4, 2011

(54) SERVER SIDE LOGIC UNIT TESTING

(75) Inventor: Kwong P. Tsang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 11/843,685

(22) Filed: Aug. 23, 2007

(65) Prior Publication Data

US 2009/0055686 A1    Feb. 26, 2009

(51) Int. Cl.
*G06F 11/00* (2006.01)
(52) U.S. Cl. .......................... 714/38; 714/33; 717/106; 717/122; 717/124
(58) Field of Classification Search ............... 714/38, 714/106, 112, 33; 717/106, 122, 124
See application file for complete search history.

(56) References Cited

U.S. PATENT DOCUMENTS

| 2001/0012986 | A1* | 8/2001 | Conan et al. ............... 702/188 |
| 2003/0159089 | A1* | 8/2003 | DiJoseph .................... 714/38 |
| 2004/0153830 | A1* | 8/2004 | Cebula et al. ............... 714/38 |
| 2004/0210866 | A1* | 10/2004 | Friedman et al. ........... 717/106 |
| 2005/0229159 | A1* | 10/2005 | Haba et al. ................. 717/122 |
| 2005/0240931 | A1* | 10/2005 | Padisetty et al. ........... 718/100 |
| 2006/0075303 | A1* | 4/2006 | Ulrich et al. ................ 714/38 |
| 2006/0184918 | A1* | 8/2006 | Rosaria et al. ............. 717/124 |
| 2007/0168744 | A1* | 7/2007 | Pal et al. ..................... 714/38 |
| 2007/0220342 | A1* | 9/2007 | Vieira et al. ................ 714/33 |

* cited by examiner

*Primary Examiner*—Philip Guyton
*Assistant Examiner*—Jeison C Arcos
(74) *Attorney, Agent, or Firm*—Cantor Colburn LLP; John Flynn

(57) ABSTRACT

A method for server side logic unit testing in an application server environment is provided. The method includes reading a plurality of input parameters from an XML input repository, where the input parameters define an initial state of a test environment, and configuring the test environment to the initial state using the input parameters. The method further includes executing a unit test case using a command test manager to interface between the unit test case and the test environment, where the command test manager translates a command from the unit test case into a test command. The method also includes passing the test command to controller command logic, and accessing test data stored in a database through an access bean using a bean simulator. The method additionally includes receiving test results, including catching an exception on an error condition, and outputting the test results to an XML output repository.

6 Claims, 2 Drawing Sheets

SERVER SIDE LOGIC UNIT TESTING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer software unit testing, and particularly to server side logic unit testing in an application server environment.

2. Description of Background

Unit testing is the process of validating that individual units of software source code are working properly. While unit-testing approaches can be very effective in testing stand alone or simple applications, numerous difficulties arise when attempting to perform unit testing in complex applications. For example, some e-commerce applications leverage services and commands provided by a run-time infrastructure that is dependent upon the availability of numerous components. Interdependency on components such as a front-end web page, a messaging system, a database, and other components can reduce the effectiveness of unit testing and significantly impede development cycle time. Moreover, even when components are made available to support unit testing, they often fail to support full unit testing, resulting in performance of a more limited end-to-end test that may not adequately handle certain failure conditions.

JUnit is a popular open-source testing framework for Java unit testing. It would be beneficial to develop a method to enable the use of a unit testing framework, such as JUnit, in an application server environment to increase the speed of testing and ensure higher quality source code development and deployment. Accordingly, there is a need in the art for a method to perform server side logic unit testing in an application server environment that supports an existing unit testing framework, such as JUnit.

SUMMARY OF THE INVENTION

The shortcomings of the prior art are overcome and additional advantages are provided through the provision of a method for server side logic unit testing in an application server environment. The method includes reading a plurality of input parameters from an eXtensible Markup Language (XML) input repository, where the input parameters define an initial state of a test environment, and configuring the test environment to the initial state using the input parameters. The method further includes executing a unit test case using a command test manager to interface between the unit test case and the test environment, where the command test manager translates a command from the unit test case into a test command. The method also includes passing the test command to controller command logic, where the controller command logic passes the test command to a command simulator, and accessing test data stored in a database through an access bean using a bean simulator. The method additionally includes receiving test results from the test command and the test data produced via the command simulator and the bean simulator, including catching an exception on an error condition, and outputting the test results to an XML output repository.

A computer program product corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effect

As a result of the summarized invention, technically we have achieved a solution which enables server side logic unit testing in an application server environment that supports an existing unit testing framework, such as JUnit. A command test manager converts unit test cases into commands that are compatible with the application server environment. The command test manager receives the test results and stores them in a format compatible with a unit testing analysis tool.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods and computer program products for server side logic unit testing in an application server environment. An application server environment may be tightly coupled with many interdependent services within a run-time framework. For example, IBM's WebSphere® Commerce includes a run-time framework that handles system and user requests, as well as performing operations to fulfill the requests. A run-time framework may include a Web server, plug-ins, a servlet engine, messaging interfaces, scheduling control, multiple registries, a command view, a command controller, database access interfaces, and the like. While an application server can enable the development of countless applications and utilities, either generic or customized, testing of modules developed to run in such an environment can pose many challenges. In exemplary embodiments, a clone of objects needed to support testing of modules in an application server environment is provided to support unit testing without using a complete run-time framework. Further details are disclosed herein.

Figure 1:
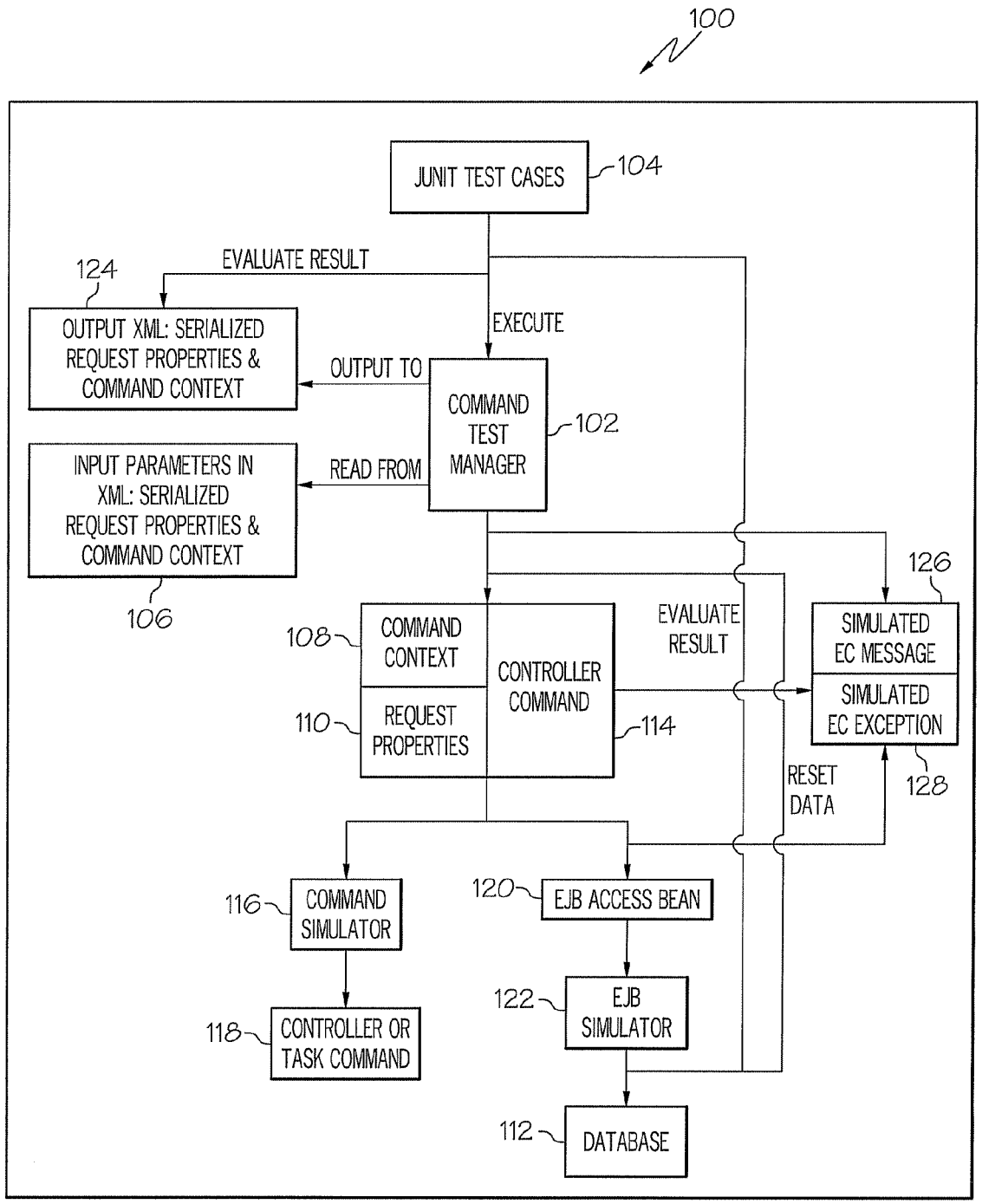
FIG. 1 depicts one example of a system for server side logic unit testing in an application server environment.

Turning now to the drawings in greater detail, it will be seen that in FIG. 1 there is a computer system 100 for server side logic unit testing in an application server environment depicted in accordance with exemplary embodiments. The computer system 100 is high-speed processing device (e.g., a mainframe computer) including at least one processing circuit (e.g., a CPU, not depicted) capable of reading and executing instructions, and producing output. The computer system 100 executes a command test manager 102 to control the execution of unit test cases, such as JUnit test cases 104. In exemplary embodiments, the JUnit test cases 104 are unit test cases written in a JUnit compatible format for testing command performance within the application server environment of the computer system 100. In exemplary embodiments, the command test manager 102 receives one or more commands from the JUnit test cases 104 to execute a selected test. The JUnit test cases 104 may also include an input parameter list to configure a test environment for the selected test. The command test manager 102 can read input parameters from an eXtensible Markup Language (XML) input repository 106 to configure an initial state for a command context 108, request properties 110, a database 112, and other assets used to prepare the test environment. The contents of the XML input repository 106 may be stored in a serialized format. The XML input repository 106 can be populated with data through manual editing or directly exported from a test case of a previously executed command.

Once the command test manager 102 establishes the initial state of the test environment, the command test manager 102 creates a tested command based on the selected test from the JUnit test cases 104. In exemplary embodiments, the command test manager 102 passes the tested command to controller command logic 114. The controller command logic 114 may pass input parameters to underlying logic as part of test execution and trigger underlying processes to execute. For example, a tested command may trigger a command simulator 116 to run, which passes commands to a controller or task command 118. The controller or task command 118 can perform individual units of work, such as accessing stored data. Data may be accessed via an Enterprise JavaBean™ (EJB) access bean 120, which is a server-side component for modular construction of enterprise applications supporting data access operations. The use of the EJB access bean 120 can provide an interface to access specific types of data, such as business data in the database 112, while hiding other data. In exemplary embodiments, the EJB access bean 120 interfaces with an EJB simulator 122 to create a bean management environment consistent with persistent storage of enterprise or application data within the database 112.

Results of attempted accesses to the database 112 may be returned to the controller command logic 114 or the command test manager 102 for further analysis. Similarly, test commands issued to the command simulator 116 may produce results that can be returned to the controller command logic 114 or the command test manager 102 for further analysis. As test commands are processed and the database 112 is accessed, the state of the test environment may change, resulting in modifications to the state of the command context 108, the request properties 110, and the database 112, as well as other test environment objects. In exemplary embodiments, if there are no errors produced as a result of the test command or data access request, the controller command logic 114 passes updated results of the test command or commands preformed back to the command test manager 102. The command test manager 102 outputs results to an XML output repository 124, including test environment state information, such as the state of the command context 108, the request properties 110, and the database 112, as well as other test environment objects. The command test manager 102 may serialize the results prior outputting to the XML output repository 124, formatting the results in an XML format suitable for persistent storage. Although the XML input repository 106 and the XML output repository 124 are depicted as separate repositories, it will be understood that they can be combined as a single common XML repository with input and output interfaces.

To more fully simulate a complete application server environment, the controller command logic 114 may also interface to simulated ECMessages 126 and simulated ECExceptions 128. In exemplary embodiments, the simulated ECMessages 126 include simulated error messages to simulate system behavior when an error condition occurs as a result of a test command or attempted data access. The simulated ECMessages 126 may also include other messages such as warnings, status, debug information, or general information. Moreover simulated ECMessages 126 can be targeted to system issues or target a specific user. The simulated ECMessages 126 may also serve as a log of messages resulting from the execution of test commands. The simulated ECExceptions 128 can catch or create system/application exceptions based upon the results of test command execution or attempted data access. In exemplary embodiments, when a test command results in an error, such as an unhandled test result, an exception is thrown and error information is logged. In exemplary embodiments, the command test manager 102 catches thrown exceptions using the simulated ECException 128 and writes error messages with error information to the simulated ECMessages 126 or to an external log file (not depicted). The command test manager 102 can pass any exceptions caught and messages, or references to messages, to the JUnit test cases 104 so that the JUnit test cases 104 can capture the results in its native format. The JUnit test cases 104 can also access the XML output repository 124 to analyze test results, and report the results to a user of the computer system 100. Results may be output through a graphical user interface (GUI) (not depicted) or written to a file using a JUnit output methodology.

Figure 2:
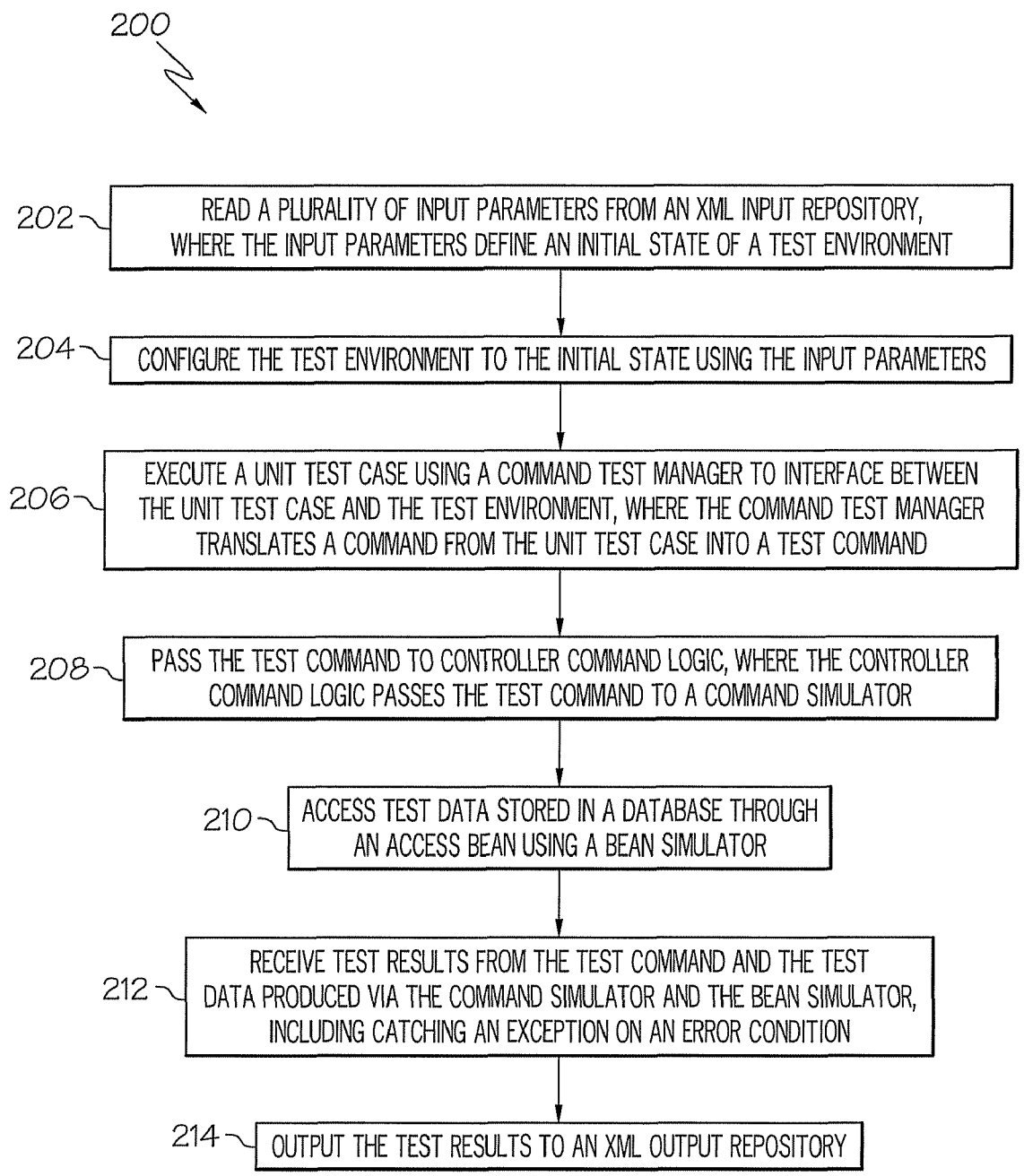
FIG. 2 depicts a process for server side logic unit testing in an application server environment in exemplary embodiments.

Turning now to FIG. 2, a process 200 for server side logic unit testing in an application server environment will now be described in accordance with exemplary embodiments, and in reference to the computer system 100 of FIG. 1. A user can perform the process 200 interactively through the computer system 100 of FIG. 1. The user may initiate the process 200 by making a request to perform a particular unit test case through the JUnit test cases 104. In exemplary embodiments, the JUnit test cases 104 initiates execution of the command test manager 102. At block 202, the command test manager 102 reads multiple input parameters from the XML input repository 106, where the input parameters define an initial state of a test environment. The test environment may include many objects, such as command context 108, request properties 110, and the database 112.

At block 204, the command test manager 102 configures the test environment to the initial state using the input parameters from the XML input repository 106. At block 206, the command test manager 102 executes a unit test case from the JUnit test cases 104, which may include translating and interpreting commands from a unit test case format into specific test commands and/or data access requests. In exemplary embodiments, the command test manager 102 acts as an interface between the unit test cases within the JUnit test cases 104 and the test environment.

At block 208, the command test manager 102 passes a test command to the controller command logic 114. The controller command logic 114 may then pass the test command to the command simulator 116. The command simulator 116 can translate the test command into a specific controller or task command 118 capable of interpretation by the application server environment of the computer system 100. The controller or task command 118 may include a request to access specific data within the database 112.

At block 210, test data stored in the database 112 can be accessed upon request through the EJB access bean 120 using the EJB simulator 122. The specific request can come from the controller or task command 118 or the controller command logic 114. While prior art unit testing methods may be incapable of communicating with an EJB access bean in an application server environment, the present invention can effectively communicate JUnit test commands to the EJB access bean 120 through the command test manager 102 and the associated test environment depicted in FIG. 1 within the computer system 100.

At block 212, the command test manager 102 receives and handles test results from the test command and the test data produced via the command simulator 116 and/or the EJB simulator 122. The command test manager 102 also catches any exceptions thrown on an error condition using the simulated ECExceptions 128, as well as logging and/or receiving messages using the simulated ECMessages 126. In exemplary embodiments, the command test manager 102 passes exceptions and error message information to the JUnit test cases 104 for further processing, where the results can be formatted for display to a user of the computer system 100.

At block 214, the command test manager 102 outputs the test results to the XML output repository 124. As previously described, the XML input repository 106 and the XML output repository 124 may be interfaces to a common XML repository such that outputs from a test can serve as inputs to another test. The JUnit test cases 104 can access the XML output repository 124 to read the results of unit test execution.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for server side logic unit testing in an application server environment, comprising:

reading a plurality of input parameters from an eXtensible Markup Language (XML) input repository, wherein the input parameters define an initial state of a test environment;

configuring the test environment to the initial state using the input parameters, wherein the initial state of the test environment includes a command context, request properties, and a database state;

executing a unit test case from JUnit test cases using a command test manager to interface between the unit test case and the test environment, wherein the command test manager translates a command from the unit test case into a test command;

passing the test command to controller command logic, wherein the controller command logic passes the test command to a command simulator;

accessing test data stored in a database through an access bean using a bean simulator;

receiving test results from the test command and the test data produced via the command simulator and the bean simulator, including catching an exception on an error condition; and outputting the test results to an XML output repository, wherein the XML output repository interfaces with the XML input repository such that the test results serve as input to other unit test cases.

2. The method of claim 1 wherein the XML input file includes serialized command context and request properties.

3. The method of claim 1 wherein the XML input repository and the XML output repository are interfaces to a common XML repository.

4. The method of claim 1 wherein the command test manager outputs the test results to the XML output repository in a serialized format.

5. The method of claim 1 wherein the command test manager logs an error message upon catching an exception, and the command test manager returns the exception to the unit test case.

6. A computer program product for server side logic unit testing in an application server environment, the computer program product comprising:

a storage medium readable by a processing circuit and storing instructions for execution by the processing circuit for implementing a method, the method comprising:

reading a plurality of input parameters from an eXtensible Markup Language (XML) input repository, wherein the input parameters define an initial state of a test environment;

configuring the test environment to the initial state using the input parameters, wherein the initial state of the test environment includes a command context, request properties, and a database state;

executing a unit test case using a command test manager to interface between the unit test case and the test environment, wherein the command test manager translates a command from the unit test case into a test command;

passing the test command to controller command logic, wherein the controller command logic passes the test command to a command simulator;

accessing test data stored in a database through an access bean using a bean simulator;

receiving test results from the test command and the test data produced via the command simulator and the bean simulator, including catching an exception on an error condition; and outputting the test results to an XML output repository, wherein the XML output repository interfaces with the XML input repository such that the test results serve as input to other unit test cases.

* * * * *